United States Patent [19]

Uchikata et al.

[11] Patent Number: 4,639,744

[45] Date of Patent: Jan. 27, 1987

[54] RECORDING APPARATUS

[75] Inventors: Yoshio Uchikata, Yokohama; Mineo Nozaki, Kawasaki; Osamu Asakura, Tokyo; Masasumi Nagashima, Yokosuka, all of Japan

[73] Assignee: Canon Kabushiki Kaisha, Tokyo, Japan

[21] Appl. No.: 553,817

[22] Filed: Nov. 21, 1983

[30] Foreign Application Priority Data

Dec. 1, 1982 [JP] Japan ................................ 57-209441
Dec. 3, 1982 [JP] Japan ................................ 57-211294

[51] Int. Cl.[4] ............................................. G01D 15/10

[52] U.S. Cl. .......................... 346/76 PH; 346/139 R; 400/356; 400/120

[58] Field of Search .......... 346/139 R, 139 C, 76 PH; 358/303, 298, 296; 400/356, 120; 101/93.43, 93.37, 93.46, 93.02; 214/216 PH; 369/216, 217

[56] References Cited

U.S. PATENT DOCUMENTS 4,173,273 11/1979 Hanakata ...................... 346/76 PH

*Primary Examiner*—Arthur G. Evans
*Attorney, Agent, or Firm*—Fitzpatrick, Cella, Harper & Scinto

[57] ABSTRACT

A recording apparatus comprises circuitry supplied with electric power for moving a recording head toward a recording medium into a recording position and a solenoid for holding the recording head in the recording position, circuitry for generating timing signals, and control circuitry for controlling the electric power so as gradually to vary the electric power applied to the solenoid in accordance with the timing signals.

28 Claims, 7 Drawing Figures

RECORDING APPARATUS

BACKGROUND OF THE INVENTION

1. Field of the Invention

This invention relates to a recording apparatus in which a recording head is adapted to be moved between a recording position and a recording stand-by position.

2. Description of the Prior Art

Generally, in recording apparatuses, the recording head is adapted to be moved between a recording position and a recording stand-by position. It is important in obtaining a recording of stable quality to fix the recording head accurately and firmly at the recording position. It would therefore occur to apply a strong force to the recording head to thereby move the head from the stand-by position to the recording position and further hold the head at the recording position. However, if this is done, there is a danger that the recording head would cause the phenomenon of bouncing in the recording position, or the recording position would become inaccurate due to the resulting impact. For example, most thermal printers are of the type in which a thermal head supported at a fulcrum is driven by a solenoid and pivoted about the fulcrum to thereby effect recording, but depending on the setting of the pressure, there may occur the phenomenon of bouncing in which the thermal head when urged against recording paper bounces on the platen. Also, in the case of thermal printers, there has been the disadvantage that even if no recording current is applied to the thermal head, the ink of the ink ribbon is transferred to the recording paper due to the impact during headdown which stains the recording paper at the top of the record line.

SUMMARY OF THE INVENTION

It is an object of the present invention to fix the recording head accurately and firmly at the recording position.

It is another object of the present invention to eliminate the phenomenon of bouncing of the recording head.

It is still another object of the present invention to prevent the recording paper from being stained due to the impact of the thermal head.

It is yet still another object of the present invention to easily control the force for moving the recording head by a voltage applied to the solenoid.

It is a further object of the present invention to easily control the force for moving the recording head by a current applied to the solenoid.

Other objects of the present invention will become apparent from the following detailed description taken in conjunction with the accompanying drawings.

DESCRIPTION OF THE PREFERRED EMBODIMENTS

Figure 1:
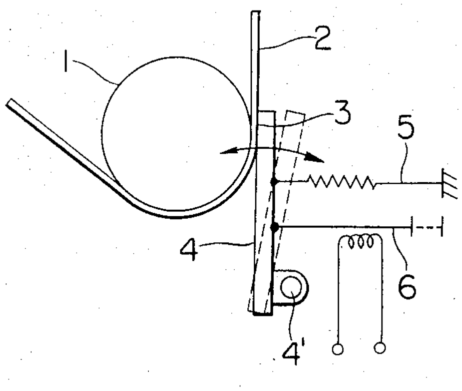
FIG. 1 is a schematic view illustrating the structure of the recording portion of a thermal type recording apparatus common to first and second embodiments of the present invention.

Referring to FIG. 1, it shows an example of the thermal type recording apparatus to which the present invention may suitably be applied. In FIG. 1, recording paper 2, which is a recording medium, is wrapped about and held by a platen 1. On a shaft 4' provided near the platen 1, a thermal head 4 is supported for pivotal movement, in the directions shown by the two-headed arrow by means of a bearing provided at one end of the thermal head. A recording heat-generating portion is provided on the surface of the free end of the thermal head 4 which is opposed to the recording paper. In a recording position indicated in FIG. 1 by solid line in which, during recording, the thermal head 4 has been moved from a recording stand-by position indicated in FIG. 1 by broken line spaced apart from the recording paper 2 toward the platen 1 and the recording paper 2 and has been urged against the recording paper as indicated by solid line, the recording heat-generating portion is interposed between the thermal head and the recording paper and recording is effected through an ink ribbon 3 stretched in an ink ribbon cassette, not shown. However, the above-described head-down mechanism itself is similar to a conventional one.

The thermal head 4 is normally biased to right, as viewed in FIG. 1, by a spring 5, but during recording, a solenoid 6 is energized, whereby the thermal head is moved leftwardly, as viewed in FIG. 1, by the force of the armature of the solenoid 6.

In this manner, the solenoid 6 serves as means for moving the thermal head 4 from its stand-by position to its recording position and, during recording, it serves as holding means for holding the thermal head 4 in its urged position with respect to the recording paper.

When recording is terminated, the solenoid 6 is deenergized, whereby the thermal head may be returned to its original position by the biasing force of the spring 5. Thus, the spring 5 and the solenoid 6 together constitute means for urging the thermal head 4 against the recording paper and spacing the thermal head 4 apart from the recording paper.

A first embodiment of the control circuit of the above-described recording apparatus will now be described.

Figure 2A:
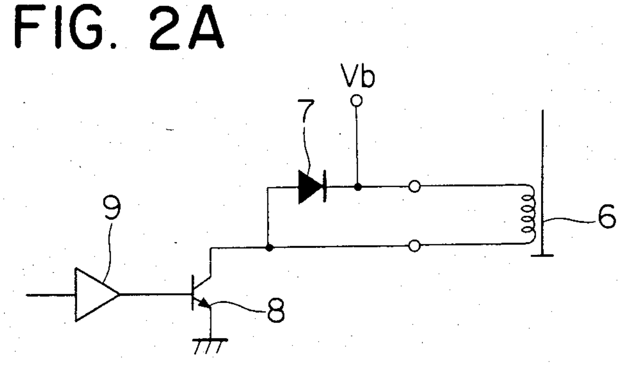
FIGS. 2A and 2B are circuit diagrams showing a first embodiment of the control circuit.

FIG. 2A shows a driving circuit using the chopper control of the solenoid 6.

A source voltage Vb, which is a supply source of the power applied to the solenoid 6, is applied to one side terminal of the solenoid 6, and the both terminals of the solenoid 6 are connected together by a clamp diode 7. Further, the collector of a switching transistor 8 having its emitter grounded is connected to the terminal opposite the terminal to which the source voltage Vb is applied, and a head-down signal is adapted to be applied to the base of the switching transistor 8 through an open collector buffer 9.

Figure 3:
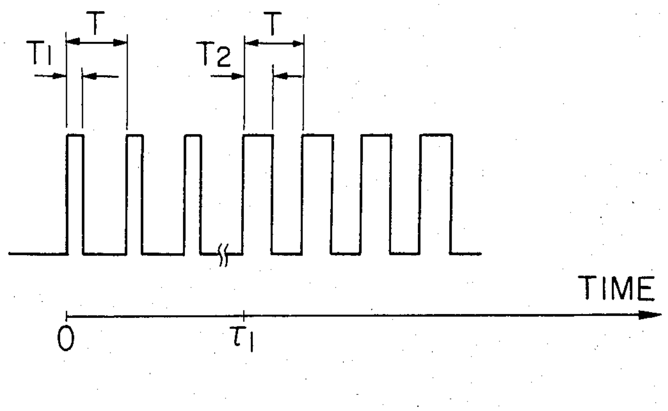
FIGS. 3 and 4 are a timing chart and a graph, respectively, illustrating the operation of the first embodiment.
Figure 2B:
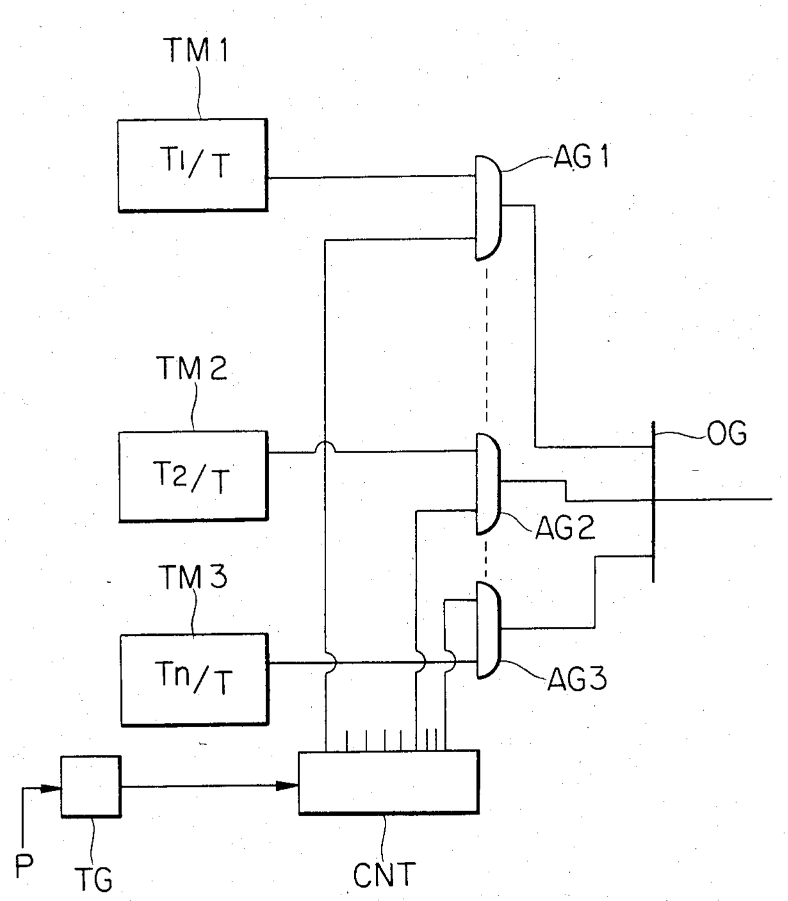

FIG. 2B is a diagram of a circuit which puts out a signal of such a waveform as shown in FIG. 3.

TM1 designates a signal generator, and it is to be understood that this signal generator generates a signal of duty $T_1/T$, where $T_1$ is the pulse width of a control signal and T is the period of such control signal. TM2 also denotes a signal generator which generates a signal of duty $T_2/T$. TM3 also designates a signal generator which generates a signal of duty Tn/T. In FIG. 2B, the signal generators among TM1, TM2 and TM3 are omitted and four signal generators TM1 similar to the signal generator TM1 are disposed between the signal generators TM1 and TM2, and two signal generators TM2 similar to the signal generator TM2 are disposed between the signal generators TM2 and TM3. As will later be described in detail, these signal generators TM1, TM2 and TM3 together form a memory portion for storing therein the different current values of the current applied to the solenoid 6 in their stagewisely increased form.

AG1, AG2 and AG3 designate AND gates which provide outputs for controlling the signals of the signal generators TM1, TM2 and TM3, respectively. CNT denotes a counter for rendering each of the AND gates AG1, AG2 and AG3 active. TG designates a timing signal generator which puts out timing pulses at a predetermined interval and causes the counter CNT to advance stepwisely. OG denotes an OR gate which transmits the outputs of the AND gates AG1, AG2 and AG3 to the open collector buffer 9.

When a recording instruction P is applied to the timing signal generator TG, this timing signal generator TG puts out timing pulses and initially sets the counter CNT by the first timing pulse and causes the counter CNT to stepwisely advance by the second timing pulse. Thus, when there is present the recording instruction P, the counter CNT counts 1 and opens the AND gate AG1, thereby applying a signal generated by the first signal generator TM1 to the open collector buffer 9 through the OR gate OG. Thus, the counter CNT may be said to be selecting means which stagewisely reads out the stored contents from the signal generators TM1, TM2 and TM3, which are memory portions, selects and outputs the read-out contents. Subsequently, the counter CNT selects the second signal generator TM1 by the next timing signal coming from the timing signal generator TG, and applies a signal of duty $T_1/T$ to the open collector buffer 9 through an AND gate (not shown) and the OR gate OG. Thereafter, in a similar manner, the counter CNT stepwisely advances each time a timing pulse arrives, and selects the next signal generators in succession. In this manner, a waveform as shown in FIG. 3 is output from the OR gate OG.

By this output, the switching transistor 8 is caused to repeat ON/OFF at a similar timing and, if the switching frequency thereof is made sufficiently high, a predetermined current will flow to the solenoid 6 under the influence of inductance. The value of this current flowing to the solenoid 6 is proportional to the duty ratio Tn/T and therefore, if the duty ratio is changed from $T_1/T$ to $T_2/T$ as shown in FIG. 3, the current applied to the solenoid 6 will increase in accordance with this rate of change, whereby the drive force of the solenoid 6 can be increased.

The signal by the duty ratio $T_1/T$ produces a force which slowly moves the thermal head 4 toward the platen 1 against the force of the spring 5, but is not sufficient to urge the thermal head 4 against the recording paper 2 and effect heat generation and recording. On the other hand, the signal by the duty ratio $T_2/T$ causes the solenoid 6 to generate a force sufficient to urge the recording head 4 against the recording paper 2 and effect heat generation and recording. Also, the signal of duty ratio $T_3/T$ generated by the signal generator TM3 causes the solenoid 6 to produce a greater force than the signal of duty ratio $T_2/T$. Design may be made such that the signal of duty ratio $T_3/T$ generates a smaller force for the solenoid 6 than the signal of duty ratio $T_2/T$. This is because when the thermal head 4 has been sufficiently urged against the platen 1 and it has become unnecessary to move the thermal head any more toward the platen and only the power for holding the thermal head at this position has become necessary, a smaller power (current) than before need only be applied to the solenoid 6.

Figure 4:
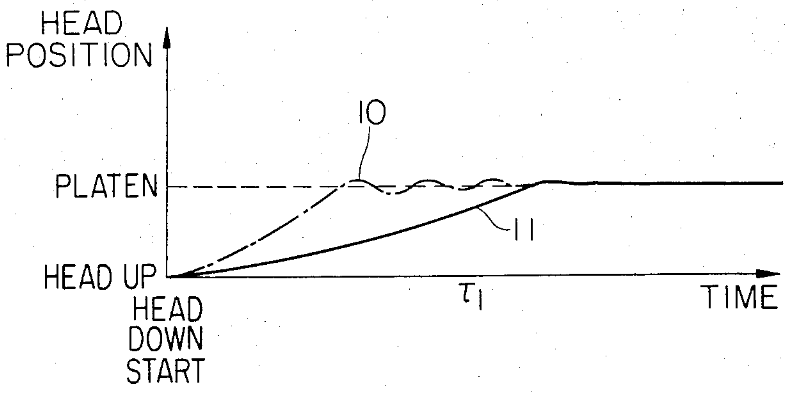

Now, the change-over from the signal of duty ratio $T_1/T$ to the signal of duty ratio $T_2/T$, as shown in FIG. 3, occurs after a time $\tau_1$ has elapsed after headdown has been initiated, and this time $\tau_1$ is the time until a predetermined number of timing pulses arrive and it will be evident from the construction of FIG. 2B that the time $\tau_1$ is determined by the period and number of these timing pulses. This $\tau_1$, as shown in FIG. 4, corresponds to a position in which the thermal head has advanced about $\frac{2}{3}$ from its stand-by position to its recording position. Thereafter, finally, i.e., when the thermal head 4 is in its recording position, a signal of duty ratio $T_3/T$ is steadily put out to the OR gate OG and the solenoid 6 urges the thermal head against the recording paper with the same force. This is because the counter CNT no longer advances stepwisely even if it is given the timing pulses.

In FIG. 4, the ordinate represents the amount of displacement of the head and the abscissa represents time. Curve 10 represents the amount of displacement of the head during the head-down operation by the conventional system Curve 11 represents the amount of displacement of the head during the head-down operation by the present invention. As is apparent from FIG. 4, in the case of the conventional system, a current corresponding to the necessary pressure is applied to the solenoid 6 simultaneously with the initiation of the head-down and the phenomenon of bouncing in which the head is caused to bounce occurs, on the platen 1 by an impact force which occurs at a point of time, whereat the recording heat-generating portion of the thermal head 4 has arrived at the platen 1, Whereas, in the case of the present invention, the moving force of the solenoid 6 is gradually enhanced and therefore the recording heat-generating portion lands slowly on the recording paper 2 on the platen 1 and thus, no bouncing occurs and any inadvertent ink transfer due to impact does not occur.

The adoption of the above-described construction further leads to the effect that the head-down position during recording can be accurately controlled and also to the possibility of securing a greater head-down stroke which can improve the operability during mounting and dismounting of the ink ribbon.

In the above-described first embodiment, a chopper circut is used as the control means for controlling the current applied to the solenoid, but of course, the current control may be effected by other circuitry.

A description will now be made of a second embodiment of the control circuit for controlling the recording apparatus of FIG. 1.

Figure 5:
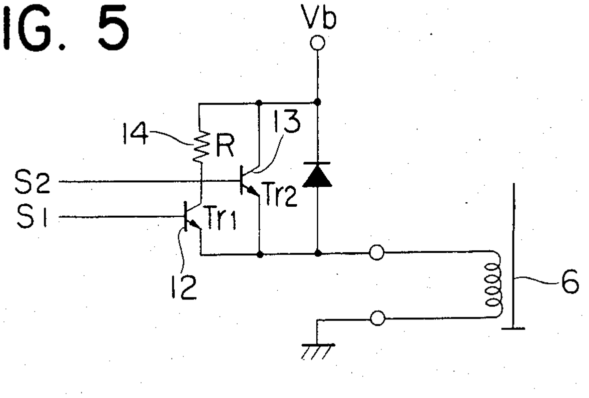
FIG. 5 is a circuit diagram showing a second embodiment of the control circuit.

As seen in FIG. 5, a drive voltage which is a drive source may be applied to the solenoid 6 through a switching transistor 12 or 13 which is switching means. That is, a source voltage Vb is connected to the solenoid 6 through a series circuit comprising the switching transistors 13 and 12 and a resistor 14 and a parallel circuit comprising a clamp diode. Control of the drive of the solenoid 6 can be accomplished by applying control signals to the bases of the switching transistors 12 and 13 from control signal lines $S_1$ and $S_2$, respectively.

Operation of the above-described circuit will now be described by reference to the timing charts of FIGS. 6(A) and (B).

Figure 6:
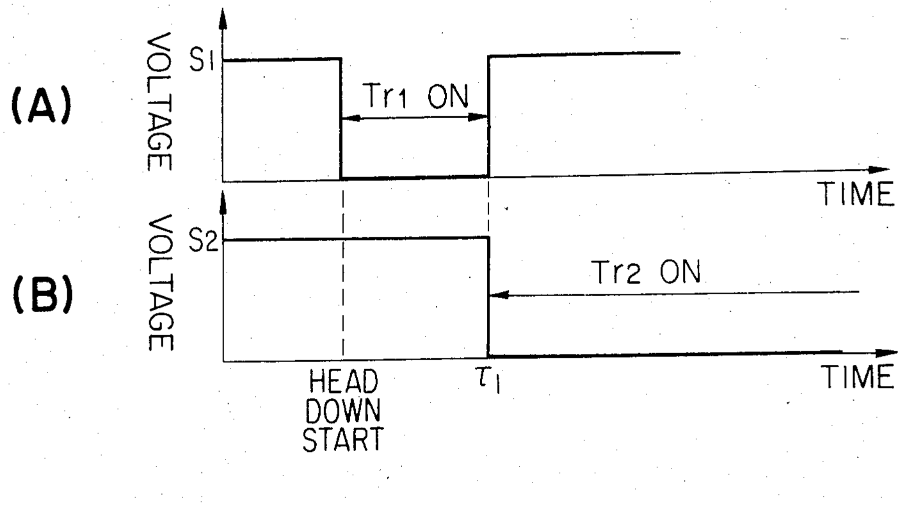
FIG. 6 is a timing chart illustrating the operation of the second embodiment.

First, at the point of time whereat head-down is started, a power supply waveform as shown in FIG. 6(A) is imparted from the signal line $S_1$ to the switching transistor 12. Thus, the base current of the switching transistor 12 flows and the switching transistor 12 is turned on, and a small voltage is applied from the voltage source Vb to the solenoid 6 through the resistor 14, so that the armature of the solenoid 6 moves slowly. Subsequently, as shown in FIG. 6(B), at the point of time $\tau_1$ whereat the distance between the platen 1 and the thermal head 4 has become less than a certain degree, the signal line $S_1$ is rendered into a high level and the switching transistor is turned off while, at the same time, the signal line $S_2$ is rendered into a low level and the switching transistor 13 is turned on, whereby the source voltage Vb is directly applied to the solenoid 6. If the source voltage Vb is preset to a voltage which provides a necessary force to the solenoid 6 during recording, the heat generation of the thermal head 4 can be controlled after the head-down is completed.

In this manner, again in the second embodiment, the same effect as that of the first embodiment is achieved.

The present invention is not restricted to the above-described first and second embodiments. For example, the present invention is not restricted to thermal printers, but is also applicable to other nonimpact type recording apparatuses such as ink jet printers and impact type recording apparatuses such as wire dot printers.

Also, the present invention may be applied to any apparatus in which control is effected so as to increase the force with which the recording head is moved from its recording stand-by position to its recording position, and the means for moving the head is not limited to a solenoid. Also, any of voltage and current may be applied to the head moving means such as a solenoid and after all, electrical power can be applied thereto. In the above-described embodiments, $\tau_1$ is set so as to precede the time when the thermal head is urged against the platen, but alternatively, $\tau_1$ may be set so as to succeed the time when the thermal head is urged against the platen.

Also, in the above-described embodiment, solenoid 6 urges the head against the platen, but in the opposite way the head may be spaced apart from the platen. In this case, spring 5 is biased so as to constantly urge the head against the platen. And when the head is urged against the platen the electric power applied to the solenoid during the head-up operation may be slowly decreased contrary to the above-described embodiment.

What is claimed is:

1. A recording apparatus comprising:

means supplied with electric power for moving a recording head for effecting recording toward a recording medium and for holding the recording head in a recording position;

means for generating timing signals; and means for controlling the value of the electric power so as to gradually vary the electric power applied to said holding means by the timing signals from said generating means.

2. A recording apparatus according to claim 1, wherein said control means includes means for selecting the value of the electric power by the timing signals and for applying the electric power of the selected value to said holding means for a time interval corresponding to a predetermined number of timing signals.

3. A recording apparatus according to claim 1, wherein said control means has a memory portion for storing different values of electric power therein, and said control means reads out the values of electric power one after another from the memory portion and applies the electric power of the values to said holding means.

4. A recording apparatus comprising:

means for causing a recording head for recording to be urged against and spaced apart from a recording medium by electric power;

supply means for supplying the electric power to said urging and spacing means;

memory means for storing different values of electric power stagewisely therein; and means for stagewisely reading out a value of electric power from said memory means and for controlling said supply means so that the electric power of the value is applied to said urging and spacing means.

5. An apparatus according to claim 1, wherein said control means controls the voltage of the electric power so as to vary the electric power.

6. An apparatus according to claim 1, wherein said control means controls the current of the electric power so as to vary the electric power.

7. An apparatus according to claim 1, wherein said control means controls the pulse width of a control signal so as to vary the electric power.

8. An apparatus according to claim 1, wherein said control means comprises a drive circuit controlled by a chopper.

9. An apparatus according to claim 1, wherein the recording head is a thermal head having a heat-generating portion.

10. An apparatus according to claim 1, wherein the recording head heats an ink ribbon to transfer ink from the ink ribbon onto the recording medium, whereby recording is effected.

11. An apparatus according to claim 1, wherein said means for moving and holding the recording head comprises a solenoid.

12. An apparatus according to claim 1, wherein said means for controlling the value of the electric power is adapted to effect a stagewise change in the electric power.

13. An apparatus according to claim 1, wherein said control means controls said means for moving and holding the recording head so that the recording head moves with a first force to reach the recording position, and is held in the recording position with a second force that is larger than the first force.

14. An apparatus according to claim 4, wherein said means for reading out and controlling reads out from said memory means a value to control the voltage of the electric power from the supply means.

15. An apparatus according to claim 4, wherein said means for reading out and controlling reads out from said memory means a value to control the current of the electric power from the supply means.

16. An apparatus according to claim 4, wherein said means for reading out and controlling reads out from said memory means a value that is characterized by a particular pulse width to control the electric power from the supply means.

17. An apparatus according to claim 4, wherein said means for reading out and controlling comprises a drive circuit controlled by a chopper.

18. An apparatus according to claim 4, wherein the recording head comprises a thermal head having a heat-generating portion.

19. An apparatus according to claim 4, wherein the recording head heats an ink ribbon to transfer ink from the ink ribbon onto the recording medium, whereby recording is effected.

20. An apparatus according to claim 4, wherein said means for causing a recording head to be urged against and spaced apart from a recording medium comprises a solenoid.

21. A recording apparatus comprising:

recording means for effecting recording on a record sheet;

support means for supporting said recording means such that said recording means can be displaced between a recording position at which recording on the record sheet is effected and a stand-by position at which said recording means is withdrawn from the recording position;

a platen for receiving a record sheet urged thereto by said recording means located at the recording position; and control means for controlling said recording means such that said recording means is displaced from the stand-by position to the recording position by a first force and is held at the recording position by a substantially constant second force which is larger than the first force.

22. An apparatus according to claim 21, wherein said control means controls a voltage that varies the force applied to said recording means.

23. An apparatus according to claim 21, wherein said control means controls an electric current that varies the force applied to said recording means.

24. An apparatus according to claim 21, wherein said control means controls a pulse width that varies the force applied to said recording means.

25. An apparatus according to claim 21, wherein said control means comprises a drive circuit controlled by a chopper.

26. An apparatus according to claim 21, wherein said recording means comprises a thermal head having a heat-generating portion.

27. An apparatus according to claim 21, wherein said recording means heats an ink ribbon to transfer ink from the ink ribbon onto the recording medium, whereby recording is effected.

28. An apparatus according to claim 21, further comprising a solenoid for displacing said recording means.

* * * * *